United States Patent
Ueda

(10) Patent No.: US 12,424,036 B2
(45) Date of Patent: Sep. 23, 2025

(54) ABNORMAL SOUND DIAGNOSTIC SYSTEM

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 18/234,941

(22) Filed: Aug. 17, 2023

(65) Prior Publication Data

US 2024/0104977 A1 Mar. 28, 2024

(30) Foreign Application Priority Data

Sep. 27, 2022 (JP) .................. 2022-154160

(51) Int. Cl.
*G07C 5/08* (2006.01)
*G01M 13/028* (2019.01)

(52) U.S. Cl.
CPC ......... *G07C 5/0825* (2013.01); *G01M 13/028* (2013.01); *G07C 5/0808* (2013.01)

(58) Field of Classification Search
CPC .. G07C 5/0825; G07C 5/0808; G01M 13/028
See application file for complete search history.

(56) References Cited

U.S. PATENT DOCUMENTS

2006/0253282 A1* 11/2006 Schmidt ............... G07C 5/0808 704/233
2007/0032968 A1 2/2007 Nakamura
(Continued)

FOREIGN PATENT DOCUMENTS

JP 2005-098984 A 4/2005
JP 2011079350 A * 4/2011
(Continued)

OTHER PUBLICATIONS

Hardik Sailor et al., Unsupervised Filterbank Learning Using Convolutional Restricted Boltzmann Machine for Environmental Sound Classification, INTERSPEECH 2017, Aug. 20-24, 2017, pp. 3107-3111.
(Continued)

*Primary Examiner* — Rufus C Point
(74) *Attorney, Agent, or Firm* — Dinsmore & Shohl LLP

(57) ABSTRACT

The abnormal sound diagnostic system of the present disclosure includes an abnormal sound diagnostic system including a diagnostic device for diagnosing abnormal sound generated in a vehicle based on data of sound emitted from a vehicle and inquiry information about abnormal sound generated in a vehicle, the abnormal sound diagnostic system including an calculation processing unit for acquiring a spectrogram indicating a relationship between time, frequency, and sound pressure from the sound data, a voice recognition unit for extracting a vocal time zone that is a time zone including a human voice from the sound data by speech recognition, a display unit for displaying a spectrogram, and a display control unit for causing the display unit to display a spectrogram so that the vocal time zone extracted by the voice recognition unit is visually distinguished from a time zone that does not include a human voice.

7 Claims, 4 Drawing Sheets

(56) References Cited

U.S. PATENT DOCUMENTS

| | | |
|---|---|---|
| 2018/0068659 A1 | 3/2018 | Ikeno et al. |
| 2023/0186690 A1* | 6/2023 | Usami .................... G07C 5/008 |
| | | 701/29.1 |

FOREIGN PATENT DOCUMENTS

| | | | |
|---|---|---|---|
| JP | 2011209593 A | * 10/2011 | |
| JP | 2011240888 A | * 12/2011 | |
| JP | 2018-040904 A | 3/2018 | |
| WO | WO-2017183410 A1 | * 10/2017 | ............. G01N 29/46 |

OTHER PUBLICATIONS

Yuji Tokozume et al., Learning from Between-Class Examples for Deep Sound Recognition, Published as a conference paper at ICLR 2018, 2018 pp. 1-13.

Dharmesh Agrawal et al., Novel Phase Encoded Mel Filterbank Energies for Environmental Sound Classification, Research Gate, Conference Paper, Nov. 2017, pp. 1-8.

Anurag Kumar et al., Knowledge Transfer from Weakly Labeled Audio Using Convolutional Neural Network for Sound Events and Scenes, arXiv: 1711.01369v4 [cs.SD], Sep. 7, 2018, pp. 1-5.

Dharmesh Agrawal et al., Novel TEO-based Gammatone Features for Environmental Sound Classification, 2017 25th European Signal Processing Conference (EUSIPCO), 2017 pp. 1859-1863.

\* cited by examiner

FIG. 2

| QUESTIONNAIRE |
|---|
| VEHICLE TYPE: XXXXX-XXXXXXX |
| REQUIREMENTS > |
| ABNORMAL NOISE DURING MORNING START-UP |
| DATE AND TIME OF OCCURRENCE > |
| ○○○○/○○/○○ □□:□□ |
| FREQUENCY OF OCCURRENCE > |
| ONCE A DAY |
| LOCATION OF OCCURRENCE > |
| SOUND TYPE > |
| RATTLE |
| VEHICLE SPEED > |
| OPERATION STATUS > |

| RECEPTION | INPUT | RECORDING |

ABNORMAL SOUND DIAGNOSTIC SYSTEM

CROSS-REFERENCE TO RELATED APPLICATION

This application claims priority to Japanese Patent Application No. 2022-154160 filed on Sep. 27, 2022, incorporated herein by reference in its entirety.

BACKGROUND

1. Technical Field

The present disclosure relates to an abnormal sound diagnostic system for diagnosing an abnormal sound generated in a vehicle.

2. Description of Related Art

Conventionally, there is known a sound vibration analysis device that performs, when a power transmission mechanism of a vehicle that includes a plurality of rotating bodies operates, analysis by capturing data of a sound or vibration generated in association with rotation of the rotating bodies, and data of a rotational speed of a selected rotating body (for example, see Japanese Unexamined Patent Application Publication No. 2005-98984 (JP 2005-98984 A)). The sound vibration analysis device performs frequency analysis on the data of the sound or vibration, and calculates an order in accordance with the specifications of the rotating body from the data of the sound or vibration on which the frequency analysis has been performed. Further, in order for the matching with the sensory test to be easy, the sound vibration analysis device uses different colors for each sound pressure level calculated from the data of the sound or vibration, in accordance with the magnitude, and causes a display unit to display the sound pressure level with the order and the vehicle speed associated therewith.

SUMMARY

Here, data of a sound acquired during traveling of a vehicle or during execution of a reproduction test or the like for reproducing an abnormal sound by causing the vehicle to travel (operate) on a roadway or a test bench, includes data of a sound other than an abnormal sound that is to be originally acquired. Therefore, in order to improve diagnosis accuracy of the abnormal sound, it is needed to reduce the influence of the sound other than the abnormal sound in the diagnosis of the abnormal sound.

In view of the above, it is an object of the present disclosure to reduce the influence of the sound other than the abnormal sound in the diagnosis of the abnormal sound, and to further improve the diagnosis accuracy of the abnormal sound.

An abnormal sound diagnostic system according to the present disclosure includes a diagnostic device configured to diagnose an abnormal sound that is generated in a vehicle, based on data of a sound emitted from the vehicle and inquiry information about the abnormal sound that is generated in the vehicle. The abnormal sound diagnostic system includes: a calculation processing unit configured to acquire a spectrogram showing a relationship between time, frequency, and sound pressure from the data of the sound; a voice recognition unit configured to extract an utterance time zone that is a time zone in which a human voice is included, from the data of the sound by voice recognition; a display unit configured to display the spectrogram; and a display control unit configured to cause the display unit to display the spectrogram such that the utterance time zone extracted by the voice recognition unit is visually distinguished from a time zone in which the human voice is not included.

In the abnormal sound diagnostic system of the present disclosure, the calculation processing unit acquires the spectrogram showing the relationship between the time, the frequency, and the sound pressure, from the data of the sound emitted from the vehicle, and the voice recognition unit extracts the utterance time zone in which the human voice is included, from the data of the sound. Here, a frequency range of the human voice is relatively wide, and in a range corresponding to the utterance time zone of the spectrogram, a large amount of noise is included. Therefore, the range corresponding to the utterance time zone is not suitable as a diagnosis range of the diagnostic device. In view of this, in the abnormal sound diagnostic system of the present disclosure, the spectrogram is displayed on the display unit such that the utterance time zone in which the human voice is included and the time zone in which the human voice is not included are visually distinguished from each other. Accordingly, it is possible to satisfactorily suppress the user of the abnormal sound diagnostic system from selecting the range corresponding to the utterance time zone of the spectrogram as the diagnosis range of the diagnostic device. As a result, it is possible to reduce the influence of the human voice that is the sound other than the abnormal sound in the diagnosis of the abnormal sound, and to further improve the diagnosis accuracy of the abnormal sound.

The display control unit may make a range corresponding to the utterance time zone of the spectrogram unselectable on the display unit.

This makes it possible to exclude the range corresponding to the utterance time zone of the spectrogram from the diagnosis range of the diagnostic device.

Further, when two of the utterance time zones are extracted by the voice recognition unit, the display control unit may cause the display unit to display a range between the two of the utterance time zones in the spectrogram as a diagnosis range of the diagnostic device.

When the data of the sound is acquired for the diagnosis of the abnormal sound, the human voice (conversation) in a vehicle cabin is often recorded immediately after the vehicle starts traveling (operating). When the abnormal sound is generated during acquisition of the data of the sound, a human voice that is a voice of a person who reacted to the abnormal sound may be recorded immediately after the abnormal sound is generated. That is, when there are two utterance time zones in which the human voice extracted by the voice recognition unit is included, there is a high possibility that the generation timing of the abnormal sound is included in the range between the two utterance time zones in the spectrogram. Therefore, when the range between the two utterance time zones in the spectrogram is displayed on the display unit in advance as the diagnosis range of the diagnostic device, after obtaining confirmation of the user of the abnormal sound diagnostic system, the diagnostic device diagnoses the diagnosis range, thereby obtaining a more accurate diagnosis result. In addition, in this aspect, the operator performing the test utters before and after the generation of the abnormal sound, so that the diagnosis range of the diagnostic device can also be determined by using the voice of the operator as a trigger.

In addition, when one or three or more of the utterance time zones are extracted by the voice recognition unit, the display control unit may cause the display unit to display an instruction for selecting the diagnosis range of the diagnostic device from a range corresponding to a time zone other than the utterance time zone of the spectrogram.

That is, in a case where there are one or three or more utterance time zones extracted by the voice recognition unit, when the diagnosis range of the diagnostic device is determined on the system side based on the utterance time zones, the diagnosis range may be too wide or may not include the generation timing of the abnormal sound. Therefore, in such a case, the instruction for selecting the diagnosis range of the diagnostic device from the range corresponding to the time zone other than the utterance time zone of the spectrogram may be displayed on the display unit. As a result, it is possible to cause the user of the abnormal sound diagnostic system to select the diagnosis range of the spectrogram, or to determine the diagnosis range on the system side, based on the inquiry information or the like, in accordance with the intention of the user of the abnormal sound diagnostic system.

Further, the abnormal sound diagnostic system may include a mobile terminal that includes the display unit, a sound acquisition unit configured to acquire the data of the sound, an inquiry information acquisition unit configured to acquire the inquiry information, the calculation processing unit, the voice recognition unit, and the display control unit, and that is configured to exchange information with the diagnostic device by communication.

As a result, it is possible to easily acquire the data of the sound, reduce the load on the mobile terminal, and obtain a more accurate diagnosis result from the diagnostic device.

Further, the diagnostic device may include a diagnosis unit constructed by machine learning, so that a cause of the abnormal sound is diagnosed based on given information, and the voice recognition unit may be constructed by machine learning, so that the utterance time zone in which the human voice is included, is extracted from the data of the sound.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is an explanatory diagram illustrating an input screen of inquiry information;

DETAILED DESCRIPTION OF EMBODIMENTS

Embodiments of the present disclosure will now be described with reference to the drawings.

Figure 1:
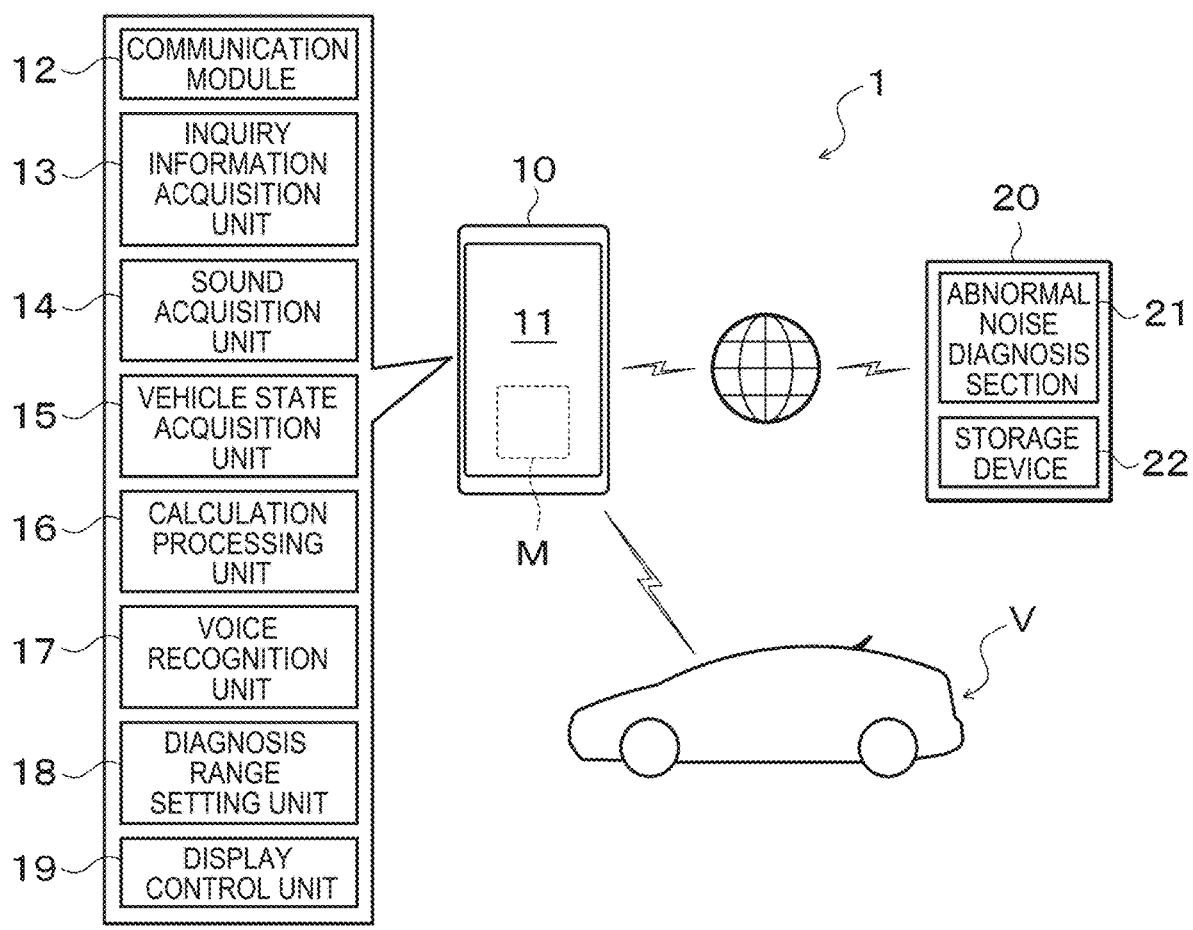
FIG. 1 is a schematic configuration diagram showing an abnormal sound diagnostic system of the present disclosure.

FIG. 1 is a schematic configuration diagram illustrating an abnormal sound diagnostic system 1 according to the present disclosure. The abnormal sound diagnostic system 1 shown in FIG. 1 is for diagnosing a cause of abnormal sound generated in a vehicle V such as a vehicle equipped with only an engine as a power generation source, hybrid electric vehicle (HEV), Plug-in hybrid electric vehicle (PHEV), battery electric vehicle (BEV), Fuel cell electric vehicle (FCEV), and includes a mobile terminal 10 and a server 20 as a diagnostic device capable of communicating with the mobile terminal 10.

The mobile terminal 10 is used by a worker (a user of the abnormal sound diagnostic system 1) such as a vehicle dealer or a maintenance shop when a response to a user (an owner) of the vehicle V in which an abnormal sound is generated or a reproduction test in which the vehicle V is traveled (operated) on a roadway or a test bench to reproduce an abnormal sound is executed. In the present embodiment, the mobile terminal 10 is a smart phone including a State Of Charge (SoC), Read Only Memory (ROM), Random Access Memory (RAM), an auxiliary storage device (flash memory) M, a display unit 11, a communication module 12, a microphone (not shown), and the like. An abnormal sound diagnosis support application (program) is installed in the mobile terminal 10. As shown in FIG. 1, the mobile terminal 10 includes an inquiry information acquisition unit 13, a sound acquisition unit 14, a vehicle state acquisition unit 15, a calculation processing unit 16, a voice recognition unit 17, a diagnosis range setting unit 18, and a display control unit 19, each of which is constructed by cooperation of an abnormal sound diagnosis support application (software) and hardware such as a SoC of the mobile terminal 10.

The display unit 11 of the mobile terminal 10 includes a touch panel type liquid crystal panel, an organic EL panel, or the like. The communication module 12 exchanges various kinds of information with the electronic control unit of the vehicle V via short-range wireless communication or a cable (dongle), and exchanges various kinds of information with the server 20 via a network such as the Internet. The inquiry information acquisition unit 13 acquires, via the display unit 11, information (hereinafter referred to as "inquiry information") indicating a state of the vehicle V at the time of occurrence of abnormal noise provided by a user of the vehicle V or the like. The sound acquisition unit 14 acquires time axis data of the sound (sound pressure) when the reproduction test is executed by the operator. The vehicle state acquisition unit 15 acquires information indicating the state of the vehicle V (hereinafter, referred to as "vehicle state data") in synchronization with the acquisition of the time axis data of the sound by the sound acquisition unit 14 when the reproduction test is executed. The vehicle state data includes a plurality of physical quantities (vehicle speed, engine speed, and the like) corresponding to the items of the inquiry information.

The calculation processing unit 16 performs Short-Time Fourier Transform (STFT) on the time-axis data of the sound acquired by the sound acquisition unit 14 to acquire a spectrogram (sound spectrogram) indicating the relation between the time, the frequency, and the sound pressure. The voice recognition unit 17 extracts a time zone including a human voice (hereinafter, referred to as "utterance time zone") from the time axis data of the sound acquired by the sound acquisition unit 14 by speech recognition. In the present embodiment, the voice recognition unit 17 includes a neural network (Recurrent Neural Network (RNN) or a Long Short Term Memory (LSTM) constructed by machine learning so as to extract a vocal time zone from the time axis data of a sound. As a technique for constructing the voice recognition unit 17, for example, the technique described in Japanese Unexamined Patent Application Publication No. 2018-40904 (JP 2018-40904 A) can also be adopted. The diagnosis range setting unit 18 sets a range (hereinafter, referred to as a "diagnosis range") to be diagnosed (analyzed) by the server 20 in the spectrogram acquired by the calculation processing unit 16 based on the extraction result of the voice recognition unit 17, the operation of the display unit 11 by the operator, and the like. The display control unit 19 controls the display unit 11.

FIG. 2 illustrates an input screen (questionnaire) and an input example of the inquiry information displayed on the display unit 11 of the mobile terminal 10. The inquiry information includes, as shown in a part of FIG. 2, vehicle identification information, commission, occurrence date and time, occurrence frequency, occurrence location of abnormal sound, type of sound, physical quantity that changes when the vehicle V travels, such as vehicle speed, driving state of the vehicle V, warm-up effect in the engine-mounted vehicle, selection items selected by the driver during driving of the vehicle V, traveling environment information of the vehicle V, and the like, and is input by the worker or the user of the vehicle V.

The vehicle identification information is information for specifying the vehicle V such as a vehicle type and a vehicle identification number (vehicle carriage number). The orders are detailed contents of the occurrence state of the abnormal sound provided by the user of the vehicle V or the like. The frequency of occurrence is selected from a drop-down list that includes a plurality of options, such as always, several times/day, once/day. The location where the abnormal sound is generated is selected from a drop-down list including parts of a plurality of vehicles such as an engine, a powertrain, a body, a brake, a door, and an interior. The type of sound is selected by an operator or the like from a drop-down list including a plurality of pseudo sound words (for example, rattling, rattling, etc.) corresponding to any abnormal sound generated in the vehicle V, and recognized as being similar to the abnormal sound actually generated by the user of the vehicle V. The physical quantity is selected from a drop-down list that includes a plurality of options, such as vehicle speed, engine speed, ON/OFF time of the brake ramp switch, steering angle, hybrid electric vehicle and battery electric vehicle high-voltage battery SOC. The driving condition of the vehicle V is selected from a drop-down list including a plurality of options such as starting, idling, stopping, starting, accelerating, constant speed running, decelerating (brake OFF), braking (brake ON), retracting, and turning. The warm-up effect is selected from a drop-down list including cold, warm, cold and warm. The selection item is selected from a drop-down list including a shift position, a traveling mode, an operating state of an auxiliary machine, and the like. The traveling environment information is selected from a drop-down list including road surface conditions such as a flat road, an uphill road, and a downhill road, weather, and the like. It is needless to say that not all of the plurality of items described above are provided by the user of the vehicle V or the like, and the inquiry information can be provided within a range known by the worker or the like.

The server 20 of the abnormal sound diagnostic system 1 is a computer (information processing device) including a Central Processing Unit (CPU), a ROM, RAM, an input/output device, a communication module, and the like, and is installed and managed by, for example, an automobile manufacturer who manufactures the vehicle V. In the server 20, an abnormal sound diagnosis unit 21 that diagnoses abnormal sound generated in the vehicle V is constructed by cooperation of hardware such as a CPU and an abnormal sound diagnosis application installed in advance. The abnormal sound diagnosis unit 21 includes a neural network (convolutional neural network) constructed by supervised learning (machine learning) so as to diagnose a component that is a cause of abnormal sound generated in the vehicle V or a source of abnormal sound based on the interview information acquired by the mobile terminal 10, time axis data of sound, and the like. Further, in the server 20, when the occurrence of a new abnormal sound in the vehicle V is found, the re-learning of the abnormal sound diagnosis unit 21 using the time axis data of the sound acquired for the new abnormal sound, the contents of each item of the inquiry information, and the like as the teacher data is executed.

Further, the server 20 includes a storage device 22 that stores, for each vehicle type, a database storing information about a plurality of abnormal sounds found to occur in the vehicle. The database stores, in association with each of a plurality of abnormal sounds, information such as time-axis data of sounds, causes of generation of abnormal sounds, components serving as generation sources, contents of inquiry information provided by a user or the like, and measures for eliminating abnormal sounds. Further, the server 20 updates the database based on information acquired from a large number of vehicles including the vehicle V, information related to a newly found abnormal sound transmitted from an automobile manufacturer (developer, etc.), a vehicle dealer, a maintenance factory, etc., and the like. As a technique for constructing the abnormal sound diagnosis unit 21, for example, one described in the following papers (1) to (5) or a combination thereof can be used.

(1) Unsupervised Filterbank Learning Using Convolutional Restricted Boltzmann Machine for Environmental Sound Classification (2) LEARNING FROM BETWEEN-CLASS EXAMPLES FOR DEEP SOUND RECOGNITION (3) Novel Phase Encoded Mel Filterbank Energies for Environmental Sound Classification (4) Knowledge Transfer from Weakly Labeled Audio using Convolutional Neural Network for Sound Events and Scenes (5) Novel TEO-based Gammatone Features for Environmental Sound Classification Next, an abnormal sound diagnosis procedure by the abnormal sound diagnostic system 1 will be described.

When a worker such as a vehicle dealer or a maintenance shop is requested to eliminate abnormal noise from a user of the vehicle V or the like, the worker listens to the inquiry information from the user or the like, and then executes a reproduction test so as to acquire information necessary for diagnosis of abnormal noise. When executing the reproduction test, the operator connects the mobile terminal 10 to the electronic control unit of the vehicle V, and places or fixes the mobile terminal 10 or an external microphone connected to the mobile terminal 10 at an appropriate position of the vehicle V. Further, the operator activates the abnormal sound diagnosis support application and turns on the start switch of the vehicle V. Accordingly, the mobile terminal 10 acquires information such as the vehicle identification number or the vehicle carriage number of the vehicle V from the electronic control device. Further, the operator taps the recording start button displayed on the display unit 11, and causes the vehicle V to travel (operate) on the roadway or the test platform, and reproduces the traveling state in which the abnormal sound is generated based on the inquiry information from the user or the like of the vehicle V.

While the vehicle V travels (operates), the sound acquisition unit 14 of the mobile terminal 10 acquires the time axis data of the sound emitted from the vehicle V at predetermined time intervals (minute time intervals) and stores the time axis data in the auxiliary storage device M, and the vehicle state acquisition unit 15 acquires the vehicle state data designated by the operator in accordance with the inquiry information from the user of the vehicle V or the like at predetermined time intervals (minute time intervals) from the electronic control device of the vehicle V in synchronization with the acquisition of the time axis data of the sound by the sound acquisition unit 14, and stores the acquired vehicle state data in the auxiliary storage device M. Then, when the operator taps the recording stop button displayed on the display unit 11, the acquisition of the time axis data of the sound and the vehicle state data is completed, and a series of processing illustrated in FIG. 3 is executed by the mobile terminal 10.

Figure 3:
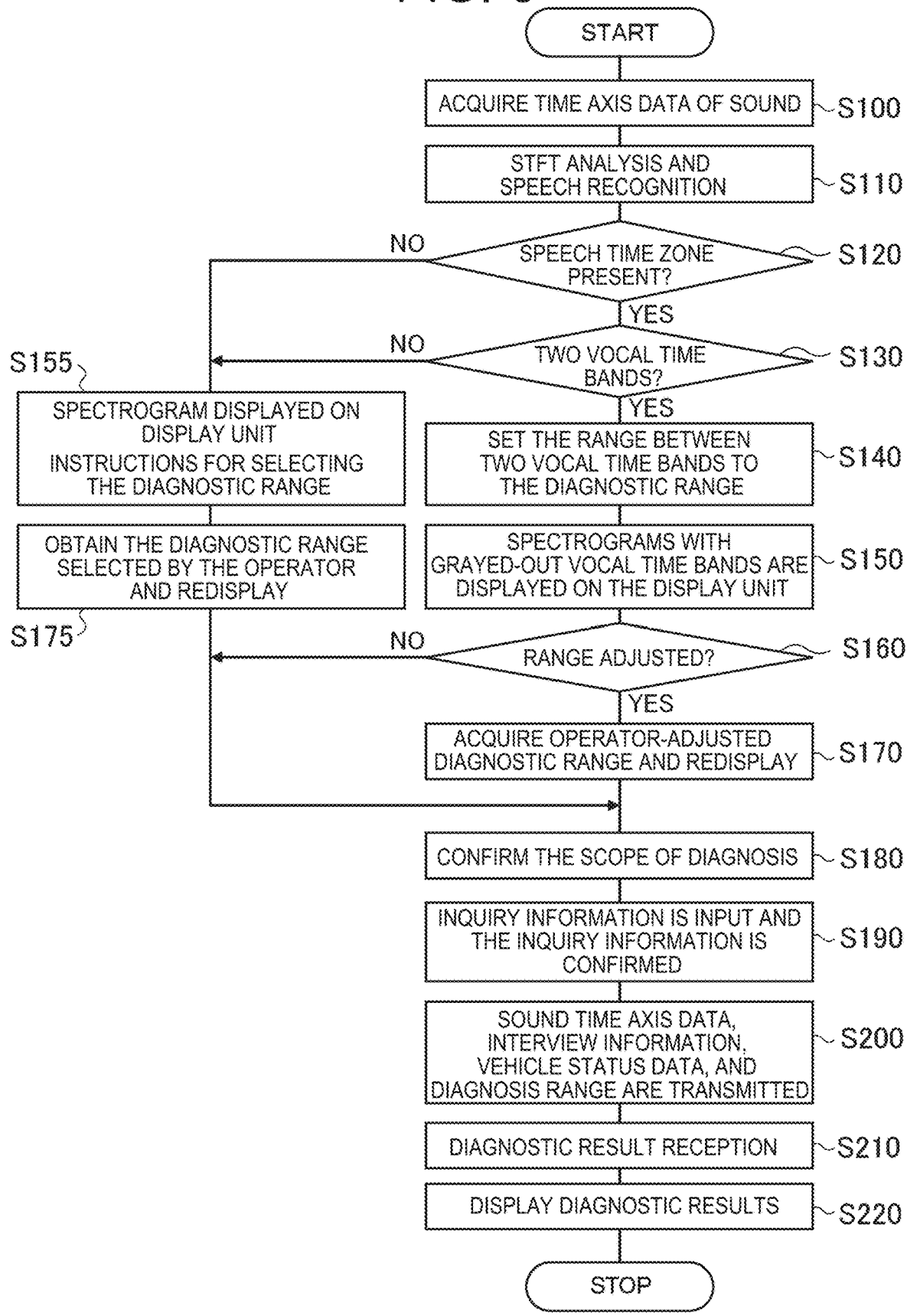
FIG. 3 is a flowchart illustrating a series of processes executed in a terminal constituting the abnormal sound diagnostic system of the present disclosure.

As illustrated in FIG. 3, the calculation processing unit 16 and the voice recognition unit 17 of the mobile terminal 10 acquire the time-axis data of the sounds acquired by the sound acquisition unit 14 after the reproduction test is completed (S100). The calculation processing unit 16 performs STFT on the time-axis data of the acquired sound to acquire a spectrogram indicating the relation between the time, the frequency, and the sound pressure (S110). Further, in S110, the voice recognition unit 17 performs a speech recognition process on the time-axis data of the acquired sound, and extracts a vocal time zone including a human voice from the time-axis data of the sound.

Figure 4:
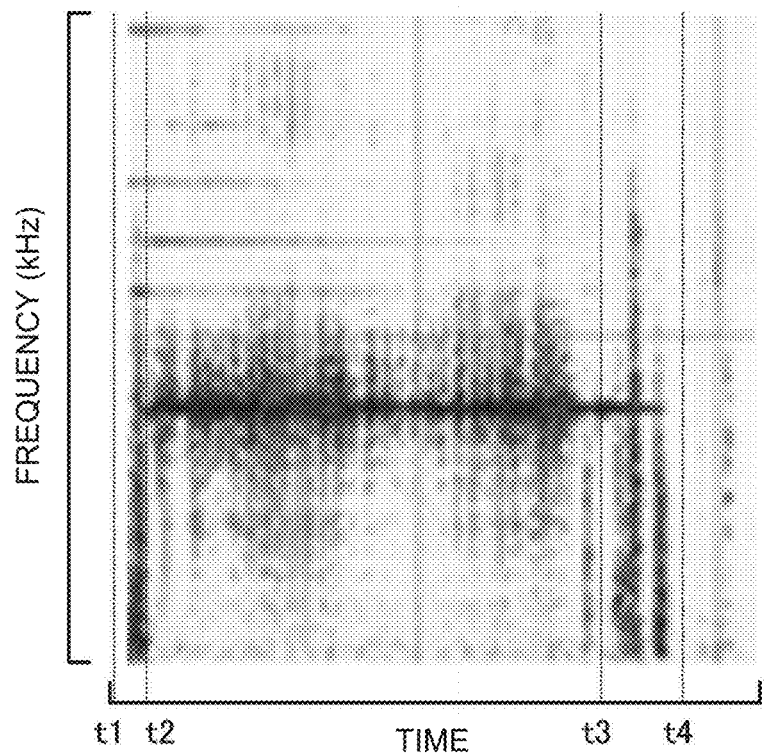
FIG. 4 is an explanatory diagram illustrating an example of a spectrogram acquired by a terminal constituting the abnormal sound diagnostic system of the present disclosure.

Subsequently, the diagnosis range setting unit 18 of the mobile terminal 10 determines whether or not the voice recognition unit 17 has extracted the vocal time zone from the time axis data of the sound (S120). When the voice recognition unit 17 determines that the utterance time zone has been extracted (S120: YES), the diagnosis range setting unit 18 determines whether the utterance time zone extracted by the voice recognition unit 17 is two (S130). When the voice recognition unit 17 determines that the two utterance time bands have been extracted (S130: YES), the diagnosis range setting unit 18 sets the range between the two utterance time bands extracted by the voice recognition unit 17 in the spectrogram acquired by the calculation processing unit 16 to the diagnosis range to be diagnosed by the abnormal sound diagnosis unit 21 of the server 20. That is, when the spectrogram as shown in FIG. 4 is acquired by the calculation processing unit 16 and the time zone from the time t1 to the time t2 and the time zone from the time t3 to the time t4 are the utterance time zone, the diagnosis range setting unit 18 sets the range from the time t2 to the time t3 of the spectrogram to the diagnosis range.

Figure 5:
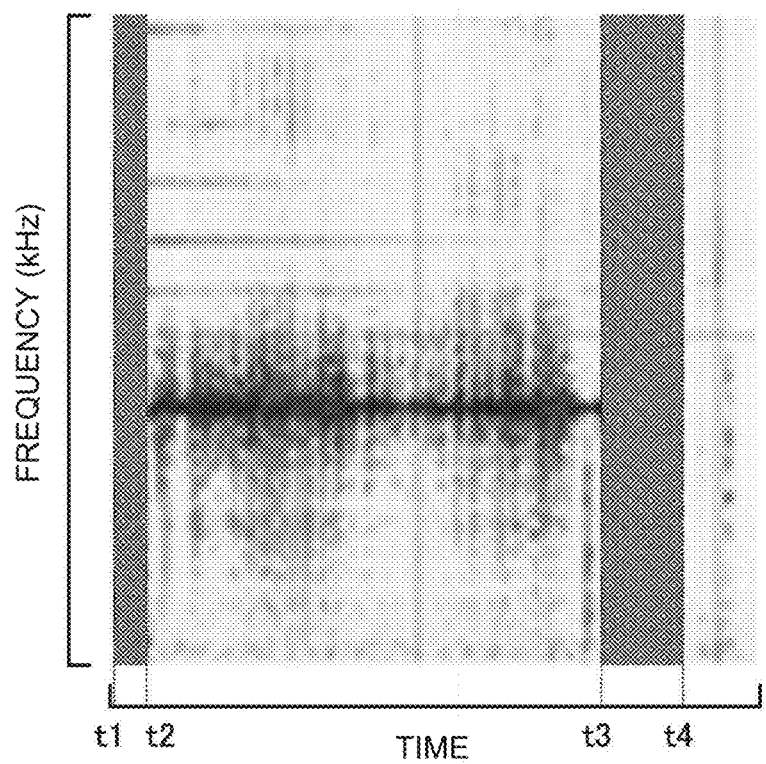
FIG. 5 is an explanatory diagram illustrating an example of a spectrogram displayed on a display unit of a terminal constituting the abnormal sound diagnostic system of the present disclosure.

In addition, in S140, the diagnosis range setting unit 18 instructs the display control unit 19 of the mobile terminal 10 to display the spectrogram on the display unit 11. As illustrated in FIG. 5, the display control unit 19 causes the display unit 11 to display a spectrogram so that only the diagnosis range set by the diagnosis range setting unit 18 can be visually recognized by graying out two utterance time zones (a time zone from the time t1 to the time t2 and a time zone from the time t3 to the time t4) extracted by the voice recognition unit 17. That is, the spectrogram is displayed on the display unit 11 such that the utterance time band including the human voice and the time band not including the human voice are visually distinguished from each other. In the present embodiment, the spectrogram is a color map showing the relationship between the time and the sound pressure level for each frequency by color-dividing the sound pressure level with the horizontal axis as the time axis and the vertical axis as the frequency axis.

Further, the display control unit 19 causes the display unit 11 to display a confirmation message for confirming whether or not the diagnosis range of the spectrogram is available to the worker, and determines whether or not the diagnosis range has been adjusted by the worker (S160). When it is determined that the diagnosis range is adjusted (narrowed down) by the worker (S160: YES), the display control unit 19 acquires the diagnosis range adjusted by the worker, and causes the display unit 11 to display the spectrogram so that only the diagnosis range selected by the worker can be visually recognized by graying out the part not selected by the worker (S170). When the adjustment of the diagnosis range by the operator is completed, the diagnosis range setting unit 18 determines the range adjusted by the operator as the diagnosis range of the spectrogram (S180). Further, when it is determined by the operator that the diagnosis range has not been adjusted (S160: NO), the diagnosis range setting unit 18 determines the range set by S140 as the diagnosis range of the spectrogram (S180).

On the other hand, when the utterance time zone is not extracted from the time axis data of the sound by the voice recognition unit 17 (S120: NO), and when the utterance time zone extracted by the voice recognition unit 17 is one or three or more (S130: NO), the display control unit 19 causes the display unit 11 to display the spectrogram acquired by the calculation processing unit 16, and causes the display unit 11 to display a message (instruction) for selecting the diagnostic area. In S155, when the utterance time zone extracted by the voice recognition unit 17 is one or three or more, the display control unit 19 causes the display unit 11 to display a message (instruction) for selecting a diagnostic range from a range corresponding to a time zone other than the utterance time zone of the spectrogram with the utterance time zone extracted by the voice recognition unit 17 being grayed out.

In response to the selection instruction on the display unit 11, the operator selects (designates) the diagnosis range of the spectrogram on the display unit 11, and the display control unit 19 acquires (S175) the diagnosis range selected by the operator. Further, in S175, the display control unit 19 causes the display unit 11 to redisplay the spectrogram so that only the diagnostic area selected by the operator can be visually recognized by graying out the part not selected by the operator. Further, the diagnosis range setting unit 18 determines the range selected by the operator as the diagnosis range of the spectrogram (S180).

After the determination of the diagnosis area, the display control unit 19 causes the display unit 11 to display a message instructing the input of the interview information, and the inquiry information acquisition unit 13 determines the information input by the operator as the final interview information after the completion of the input of the interview information by the operator (S190). Further, after the inquiry information is confirmed, an information transmission button is displayed on the display unit 11, and when the operator taps the information transmission button, information required for diagnosing an abnormal sound is transmitted from the communication module 12 of the mobile terminal to the server 20 (S200). In the present embodiment, the information transmitted from the mobile terminal 10 to the server 20 includes the time-axis data of the sound acquired by the sound acquisition unit 14, the vehicle state data acquired by the vehicle state acquisition unit 15, the information defining the diagnostic area determined by S180, and the inquiry information determined by S190.

When information necessary for diagnosis of abnormal sound is transmitted from the mobile terminal 10 to the server 20, the abnormal sound diagnosis unit 21 of the server 20 diagnoses the cause of the abnormal sound generated in the vehicle V based on the information given from the mobile terminal 10, and transmits the diagnosis result to the mobile terminal 10. The diagnosis result includes a cause of abnormal noise generated in the vehicle V, a component that is a generation source of abnormal noise, and a measure for eliminating the abnormal noise read from the storage device 22. Then, when the diagnosis result from the server 20 is received by the mobile terminal 10 (S210), the diagnosis result is displayed on the display unit 11 (S220), and a series of processes executed by the mobile terminal 10 is completed at the time of diagnosis of abnormal sound. By executing the processing illustrated in FIG. 3, the operator can accurately explain the diagnosis result from the server 20 to the user of the vehicle V or the like, and promptly proceed with the abnormal sound countermeasure.

As described above, in the abnormal sound diagnostic system 1, the calculation processing unit 16 of the mobile terminal 10 acquires a spectrogram indicating the relation between time, frequency, and sound pressure from the time-axis data of the sound emitted from the vehicle V (S110). In addition, the voice recognition unit 17 extracts an utterance time zone including a human voice from the time axis data of the sound (S110). Here, the frequency range of the human voice is relatively wide, and since the range corresponding to the utterance time zone of the spectrogram contains a large amount of noise, it is not suitable as a diagnosis range of the server 20, that is, the abnormal sound diagnosis unit 21 as a diagnostic device. Based on this, in the abnormal sound diagnostic system 1, the spectrogram is displayed on the display unit 11 such that the utterance time zone including the human voice is grayed out, and thereby the utterance time zone and the time zone not including the human voice are visually distinguished (S150, S155). Accordingly, it is possible to satisfactorily suppress the operator (the user of the abnormal sound diagnostic system 1) from selecting the range corresponding to the utterance time zone of the spectrogram as the diagnosis range of the server 20. As a result, it is possible to reduce the influence of the human voice that is the sound other than the abnormal sound in the diagnosis of the abnormal sound, and to further improve the diagnosis accuracy of the abnormal sound.

Further, the display control unit 19 of the mobile terminal 10 grays out the utterance time zone, thereby making the range corresponding to the utterance time zone of the spectrogram non-selectable on the display unit 11. This makes it possible to exclude the range corresponding to the utterance time zone of the spectrogram from the diagnosis range of the server 20.

Further, when the two utterance time bands are extracted by the voice recognition unit 17, the display control unit 19 causes the display unit 11 to display the range between the two utterance time bands in the spectrogram as the diagnostic range of the server 20 (S140-S150). When the time axis data of the sound is acquired for the diagnosis of the abnormal sound, a voice (conversation) of a person in the vehicle cabin is often recorded by the mobile terminal 10 immediately after the vehicle V starts traveling (operating) or the like. Further, when an abnormal sound is generated during acquisition of the time-axis data of the sound, the mobile terminal 10 may record the voice of the person who reacts to the abnormal sound immediately after the generation of the abnormal sound. That is, when the number of utterance time bands extracted by the voice recognition unit 17 is two, there is a high possibility that the generation timing of the abnormal sound is included in the range between the two utterance time bands in the spectrogram. Therefore, if the range between the two vocal time bands in the spectrogram is displayed on the display unit 11 in advance as the diagnosis range of the server 20 (S140-S150), the diagnosis range can be diagnosed by the abnormal sound diagnosis unit 21 after the operator's confirmation, thereby obtaining a more accurate diagnosis result. In addition, in the abnormal sound diagnostic system 1, the operator performing the test speaks before and after the occurrence of abnormal sound, and thus it is possible to determine the diagnosis range of the server 20 (the abnormal sound diagnosis unit 21) by using the voice of the operator as a trigger.

In addition, when one or three or more utterance time zones are extracted by the voice recognition unit 17 (S130: NO), the display control unit 19 of the mobile terminal 10 causes the display unit 11 to display a message for selecting a diagnostic range of the server 20 from a range corresponding to a region other than the utterance time zone of the spectrogram (S155). That is, in a case where the utterance time zone extracted by the voice recognition unit 17 is one or three or more, if the diagnosis range of the server 20 is determined on the mobile terminal 10 side (system side) based on the utterance time zone, the diagnosis range may become too wide or may not include the generation timing of abnormal noise. Therefore, in such a case, the operator can select the diagnosis range of the spectrogram by displaying a message on the display unit 11 for selecting the diagnosis range of the server 20 from a range corresponding to a region other than the utterance time zone of the spectrogram.

In S100 of FIG. 3, at least one of the inquiry information and the vehicle state data may be acquired by the mobile terminal 10 in addition to the time-axis data of the sound, and in S175, the diagnostic area may be set by the mobile terminal 10 based on at least one of the inquiry information and the vehicle state data in accordance with an instruction (intention) from the worker. In this case, the estimated occurrence time zone of the abnormal sound acquired based on at least one of the inquiry information and the vehicle state data may be set as the diagnosis range of the spectrogram. In addition, a frequency range corresponding to the pseudo sound word selected in the inquiry information may be acquired as an estimated frequency range of the abnormal sound generated in the vehicle V, and the estimated frequency range may be transmitted to the server 20 together with the diagnosis range.

Further, the abnormal sound diagnostic system 1 includes a display unit 11, an inquiry information acquisition unit 13 that acquires inquiry information, a sound acquisition unit 14 that acquires time axis data of a sound, an calculation processing unit 16, a voice recognition unit 17, and a display control unit 19, and a mobile terminal 10 that exchanges information with the server 20 by communication. As a result, it is possible to easily acquire the time axis data of the sound, reduce the load on the mobile terminal 10, and obtain a more accurate diagnosis result from the server 20. However, the abnormal sound diagnosis support application installed in the mobile terminal 10 may be installed in a tablet terminal, a laptop or desktop personal computer, or the like, and the tablet terminal or the like may be used instead of the mobile terminal 10. Further, the abnormal sound diagnostic system 1 may be configured by a single information processing apparatus such as a personal computer.

The embodiment of the present disclosure is extremely useful for diagnosing abnormal noise occurring in a vehicle.

What is claimed is:

1. An abnormal sound diagnostic system including a diagnostic device configured to diagnose an abnormal sound that is generated in a vehicle, based on data of a sound emitted from the vehicle and inquiry information about the abnormal sound that is generated in the vehicle, the abnormal sound diagnostic system comprising:

a mobile terminal configured to:

acquire a spectrogram showing a relationship between time, frequency, and sound pressure from the data of the sound;

extract an utterance time zone that is a time zone in which a human voice is included, from the data of the sound by voice recognition;

a display panel configured to display the spectrogram;

the mobile terminal configured to cause the display panel to display the spectrogram such that the utterance time zone extracted is visually distinguished from a time zone in which the human voice is not included by graying out a first utterance time zone representing a time zone from a first time to a second time, and a second utterance time zone representing a time zone from a third time to a fourth time, and displaying the grayed out first utterance time and the second utterance time zone that are extracted;

the mobile terminal configured to cause the display panel to display a confirmation message whether a diagnosis range is available;

the mobile terminal configured determine whether the diagnosis range has been adjusted;

the mobile terminal configured to acquire the diagnosis range that is adjusted, and cause the display panel to display the spectrogram including the diagnosis range that is adjusted;

the mobile terminal configured to identify an occurrence of a new abnormal sound, and re-learn the new abnormal sound via machine learning;

the mobile terminal configured to display and receive input of the inquiry information including vehicle identification information, commission, occurrence data and time, occurrence frequency, occurrence location of the abnormal sound, a type of sound, a physical quantity that changes when the vehicle travels, selection items selected during driving of the vehicle; and the mobile terminal configured to transmit, in response to confirmation of the inquiry information, a diagnosis result that includes a cause of the abnormal noise generated in the vehicle, a component that is a generation source of the abnormal noise, and a measure for eliminating the abnormal noise.

2. The abnormal sound diagnostic system according to claim 1, wherein the mobile terminal makes a range corresponding to the utterance time zone of the spectrogram unselectable on the display panel.

3. The abnormal sound diagnostic system according to claim 1, wherein when two of the utterance time zones are extracted by the mobile terminal, the mobile terminal causes the display panel to display a range between the two of the utterance time zones in the spectrogram as the diagnosis range of the diagnostic device.

4. The abnormal sound diagnostic system according to claim 3, wherein when one or three or more of the utterance time zones are extracted by the mobile terminal, the mobile terminal causes the display panel to display an instruction for selecting the diagnosis range of the diagnostic device from a range corresponding to a time zone other than the utterance time zone of the spectrogram.

5. The abnormal sound diagnostic system according to claim 1, further comprising the mobile terminal that is configured to: acquire the data of the sound, acquire the inquiry information, and exchange information with the diagnostic device by communication.

6. The abnormal sound diagnostic system according to claim 1, wherein the physical quantity comprises a vehicle speed, an engine speed, an ON/OFF time of a brake ramp switch, a steering angle, a hybrid electric vehicle, and a battery electric vehicle high-voltage battery SOC.

7. The abnormal sound diagnostic system according to claim 5, wherein the selection items comprise a shift position, a traveling mode, and an operating state of an auxiliary machine.

* * * * *